United States Patent [19]

Heinz et al.

[11] Patent Number: 5,028,644

[45] Date of Patent: Jul. 2, 1991

[54] POLYARYLENE SULFIDE MOLDING COMPOUNDS HAVING INPROVED PROCESSIBILITY AND INCREASED ULTRAVIOLET STABILITY

[76] Inventors: Hans-Detlef Heinz, Krefeld; Walter Schmitt, Neuss; Klaus Reinking, Wermelskirchen; Burkhard Köhler; Rolf-Volker Meyer, both of Krefeld, all of Fed. Rep. of Germany

[21] Appl. No.: 460,029

[22] Filed: Jan. 2, 1990

[30] Foreign Application Priority Data

Jan. 13, 1989 [DE] Fed. Rep. of Germany ....... 3900915

[51] Int. Cl.$^5$ ................... C08K 5/3415; C08K 5/3467
[52] U.S. Cl. ........................................ 524/90; 524/609
[58] Field of Search ............................................ 524/90

[56] References Cited

U.S. PATENT DOCUMENTS

| | | | |
|---|---|---|---|
| 4,377,629 | 3/1983 | Tarumi et al. | 428/474.7 |
| 4,476,265 | 10/1984 | Blackwell, Jr. | 524/609 |
| 4,711,833 | 12/1987 | McAnerey et al. | 430/131 |
| 4,740,443 | 4/1988 | Nakahara et al. | 430/110 |

OTHER PUBLICATIONS

Chemical Abstracts, vol. 105, 1986: 98655b, Columbus, Ohio, p. 51.

Primary Examiner—John C. Bleutge
Assistant Examiner—David W. Woodward

[57] ABSTRACT

This invention relates to polyarylene sulfide molding compounds, preferably polyphenylene sulfide molding compounds, having improved processability and increased UV stability.

6 Claims, No Drawings

POLYARYLENE SULFIDE MOLDING COMPOUNDS HAVING INPROVED PROCESSIBILITY AND INCREASED ULTRAVIOLET STABILITY

This invention relates to polyarylene sulfide molding compounds, preferably polyphenylene sulfide molding compounds, having improved processibility and increased UV stability.

Polyarylene sulfides (PAS) are known, for example from U.S. Pat. No. 3,354,129, EP-A 171 021. They are inert, high-temperature-resistant thermoplastics which can be filled to a large extent, for example with glass fibers and/or other materials. They are used, for example, in the electrical industry.

Injection-moldable PAS molding compounds, which generally contain glass fibers and/or mineral fillers in high concentrations, are distinguished by low melt viscosities. As a result, they are not normally difficult to process by injection molding.

In the production of thin-walled moldings, however, difficulties can arise where the melts have very low flow paths in the mold. This is mainly the case when, to obtain non-warping properties, the gates are designed in such a way as to obtain preferential orientation of the glass fibers.

In the production of moldings such as these, it can be difficult to fill the molds completely despite the low viscosity of the melts because PAS melts solidify very quickly on cooling. This is attributable to the high crystallization temperature of PAS. The crystallization temperature of PPS for example is normally in the range from 230° to 250° C. (as determined by DSC measurements).

Thus, with long flow paths in the mold, the melts can be cooled during the actual filling of the mold to such an extent that they solidify with an increase in viscosity. The mold thus becomes difficult or impossible to fill. Moldings in the production of which the polymer melt begins to solidify before the mold is completely filled generally show reduced mechanical strength and surface defects away from the sprue.

Accordingly, to improve the processibility of optionally fiber-reinforced or mineral-filled polyarylene sulfide molding compounds, it would be of advantage distinctly to reduce the crystallization temperature of the polymer without adversely affecting its high degree of crystallization.

It has now been found that the crystallization temperature of polyarylene sulfides, preferably polyphenylene sulfides (PPS), can be distinctly reduced without a significant reduction in the degree of crystallinity of the polymer by the addition of special high molecular weight aniline-nitrobenzene dyes (nigrosines). It has furthermore surprisingly been found that the UV stability of arylene sulfide polymers can also be increased by this step.

Accordingly, the present invention relates to polyarylene sulfide molding compounds, preferably polyphenylene sulfide molding compounds, prepared by melting together A) 90 to 99.95% by weight, based on the weight of A) and B) preferably 95 to 99.9% by weight and, more preferably, 97 to 99.8% by weight of polyarylene sulfides, preferably polyphenylene sulfide, B) 0.05 to 10% by weight, based on the weight of A) and B), preferably 0.1 to 5% by weight and, more preferably, 0.2 to 3% by weight of special aniline-nitrobenzene dyes (nigrosines) and C) optionally up to 300% by weight, based on the total weight of components A) and B), of other additives.

Aniline-nitrobenzene dyes suitable for use in accordance with the invention are described, for example, in Ullmanns Encyclopedia of Industrial Chemistry, Vol. A 3, 5th Edition (1985) pages 220 et seq. They are also known by the trivial name of "nigrosines". Nigrosines are generally produced from aniline, (optionally substituted) nitrobenzene, for example nitrobenzene, 2-chloronitrobenzene, 4-t-butylnitrobenzene, together with iron (II) chloride and hydrochloric acid.

The nigrosines consist of a complex mixture of high molecular weight phenazine dyes and are substantially free from nitro groups.

According to the invention, it is possible to use water-soluble, ethanol-soluble and fat-soluble nigrosines.

Water-soluble nigrosines are prepared, for example, from the hydrochlorides by treatment with anhydrous $Na_2CO_3$. The nigrosines may also contain sulfonic acid groups. The ethanol-soluble nigrosines consist of the purified hydrochlorides of the nigrosine bases. The fat-soluble nigrosines consist of the free nigrosine bases obtained from the hydrochloride by reaction with soda. Fat-soluble products are also obtained by reaction of the nigrosine bases with fatty acids, for example stearic acid or oleic acid.

The various nigrosines may be used individually or in admixture with one another.

The nigrosines are added in quantities of from 0.05 to 10% by weight, preferably in quantities of from 0.1 to 5% by weight and more preferably in quantities of from 0.2 to 3% by weight. They may be added in pure form or in the form of a concentrate.

The polyarylene sulfide molding compounds according to the invention are produced in the melt. Any of the processes normally used for mixing thermoplastics, for example kneading or extrusion, are suitable for the production of the polyarylene sulfide molding compounds according to the invention. The mixing temperature is preferably in the range from 290° C. to 370° C.

The polyarylene sulfide molding compounds according to the invention may contain typical reinforcing materials (for example glass fibers, mineral fillers), plasticizers, flow aids, UV stabilizers, nucleating agents, polymeric alloying components, antioxidants, pigments etc.

The polyarylene sulfide molding compounds according to the invention show considerably increased UV stability as well as a reduced crystallization rate for high crystallinity and substantially the same melting point. In addition, their melt viscosity may be reduced and their mold release facilitated, depending on quantity. Their surface quality can also be improved.

The polyarylene sulfide molding compounds according to the invention are suitable for the production of moldings, films, fibers, semi-finished products, composite materials and other articles, for example by the processes of injection molding, extrusion, pultrusion etc. In particular fibers having considerably increased UV stability can be produced from the arylene sulfide polymers according to the invention, such fibers having good mechanical properties. The following examples serve to illustrate the invention without limiting it thereto.

EXAMPLES

The melt viscosity measurements were carried out with a Contraves RM30 plate-cone viscosimeter while the DSC measurements were carried out with a Perkin-Elmer System 7 differential scanning calorimeter.

EXAMPLES 1 to 4

In round-bottomed flasks, mixtures of PPS granulate having a melt viscosity of 36 Pas at 320° C. and at a shear rate of $10s^{-1}$ and 0.25, 0.5, 1.0 and 2.0% by weight nigrosine (Nigrosin-Base BA, a product of BAYER AG) were heated to 320° C. and homogenized with stirring. The total stirring time after melting of the polymer was 30 minutes. The heating baths were then removed, the mixtures were cooled to room temperature and the samples chopped up.

The results of the DSC measurements and melt viscosity measurements are shown in Table 1.

COMPARISON EXAMPLE 1

Pure PPS granulate was melted in the same way as in Example 1 and stirred for 30 minutes. After removal of the heating bath, the polymer was cooled to room temperature and chopped up. The DSC results and the melt viscosities are shown in Table 1. In Tabl 1, $T_M(\Delta H_M)$ is the melting temperature (enthalpy of fusion) and $T_C$ ($\Delta H_C$) is the maximum of the crystallization exotherms (heat of crystallization) during cooling (cooling rate: 20 $Kmin^{-1}$).

TABLE 1

| Example No. | Nigrosine [% by[1] weight] | $T_M$ [°C.] | $\Delta H_M$ [J/g] | $T_C$ [°C.] | $\Delta H_C$ [J/g] | MV $10s^{-1}$ | [Pas] $100^{-1[2]}$ |
|---|---|---|---|---|---|---|---|
| 1 | 0.25 | 279.9 | 44.5 | 212.9 | 46.9 | n.d.[3] | |
| 2 | 0.5 | 279.9 | 46.1 | 218.0 | 47.0 | n.d.[3] | |
| 3 | 1.0 | 281.7 | 44.8 | 201.5 | 45.2 | 36 | 37 |
| 4 | 2.0 | 281.5 | 46.0 | 204.2 | 45.2 | 55 | 25 |
| Comp. 1 | — | 281.8 | 51.5 | 231.9 | 49.7 | 36 | 37 |

[1]based on the mixture
[2]shear rate
[3]n.d. = not determined.

The Examples show that the nigrosines to be used in accordance with the invention distinctly reduce the crystallization rate of polyarylene sulfides, even in small quantities; melt viscosity can also be reduced, depending on quantity.

The thermal stability of the compounds is excellent TGA measurements (see Table 2) show that the evaporation losses are hardly any greater than those of pure PPS.

TABLE 2

| Example No. | Nigrosine [% by weight] | Weight loss[1] in % at T in °C. | | | | | | |
|---|---|---|---|---|---|---|---|---|
| | | 150 | 200 | 250 | 300 | 350 | 400 | 450 |
| 3 | 1 | <0.1 | <0.1 | <0.1 | 0.1 | 0.15 | 0.25 | 0.55 |
| 4 | 2 | <0.1 | <0.1 | <0.1 | 0.1 | 0.2 | 0.3 | 0.55 |
| Comp. 1 | — | <0.1 | <0.1 | <0.1 | 0.1 | 0.15 | 0.25 | 0.45 |

[1]heating rate = 20 K min$^{-1}$

EXAMPLES 5+6 AND COMPARATIVE EXAMPLE

A 20% nigrosine concentrate (Nigrosin-Base BA) in polyamide 6 was incorporated into PPS in the manner described for Example 1-4.

The results of the DSC examinations are summarised in Table 3.

TABLE 3

| Example | Concentrate (%) | (Nigrosine) (%) | $T_g$ (°C.) | $\Delta H_g$ (J/g) | $T_c$ (°C.) | $\Delta H_c$ (J/g) |
|---|---|---|---|---|---|---|
| 5 | 3.0 | 0.6 | 280.6 | 42.7 | 232.9 | 44.0 |
| 6 | 5.0 | 1.0 | 278.2 | 40.0 | 230.9 | 42.2 |
| Comp. | — | — | 281.8 | 48.7 | 237.2 | 48.5 |

EXAMPLE 7 AND COMPARATIVE EXAMPLE 3

A polyphenylene sulfide having a melt viscosity in the range from 100–150 Pas (320° C./$10^3$ sec$^{-1}$ was melted in an extruder spinning apparatus and spun into multi-filaments. The spun material thus obtained was subjected to a 2-stage after-treatment process (comparative example 1).

The spinning and after-treatment conditions was well as the mechanical and thermal properties of the resulting filament yarns are summarized in Table 4.

TABLE 4

| | Ex. 7 | Comp. Ex. 3 |
|---|---|---|
| Spinning Conditions | | |
| Melting temperature (°C.) | | |
| Extruder outlet | 323 | 321 |
| Nozzle block | 299 | 304 |
| Pressure build-up (bar) Extruder | 32 | 31 |
| Nozzle (No. of holes/diameter × channel length) 30/0.2 × 0.4 | | |
| Sieving filter (mesh size) (nm) | 32 | 32 |
| Pull-off (m/nm) | 250 | 250 |
| Spinning draft | 18.3 | 19.3 |
| After-treatment conditions | | |
| Step 1: (pre-drawing) | | |
| Drawing temperature (°C.) | 87 | 87 |
| Degree of drawing | 1:3.9 | 1:4.0 |
| Step 2: (post-drawing and fixation) | | |
| Drawing temp. (°C.) | 160 | 160 |
| Degree of drawing | 1:1.35 | 1:1.15 |
| Total degree of drawing | 1:5.27 | 1:4.61 |
| Fixation temperature (°C.) (heating galette) | 203 | 203 |
| Fiber data (filament yarns) | | |
| Titer (60-filaments (dtex) | 248 | 230 |
| Strength (HZK) (cN/dtex) | 3.44 | 2.57 |
| Elongation (HZKD) (%) | 14.4 | 13.2 |
| E-modulus (cN/dtex) | 45.0 | 41.7 |
| TMA breakage (°C.) | 276 | 276 |

The fiber was subjected to a UV test (Xenotest; 42° C., 50% r.m., 300 min; radiation times: 12, 24, 48 and 144 h).

The stability was determined on the basis of the residual strength [CN/dtex] (Table 5).

TABLE 5

| | δ (cN/dtex at t (h) | | | | |
|---|---|---|---|---|---|
| | 0 | 12 | 24 | 48 | 144 |
| Example 7 | 3.44 (100 %) | 3.37 (98 %) | 3.47 (101 %) | 3.41 (99 %) | 2.82 (82 %) |
| Comp. Ex. 3 | 2.57 (100 %) | — | — | 1.80 (70 %) | 1.00 (39 %) |

The example shows that nigrosine is a very effective UV stabilizer, and in contrast to, for example, carbon black, produces good properties.

We claim:

1. Polyarylene sulfide molding compounds prepared by melting together:

A) 90 to 99.95% by weight, based on the weight of A) and B), of polyarylene sulfides; and B) 0.05 to 10% by weight, based on the weight of A) and B), of nigrosines or a mixture of nigrosines.

2. The molding compound of claim 1 additionally containing up to 300% by weight, based on the total weight of components A) and B), of reinforcing material.

3. The molding compound of claim 2 wherein the reinforcing material consists of glass fibers or mineral filler.

4. The molding compound of claim 1 additionally containing a plasticizer, flow aid, UV stabilizer, nucleating agent, polymeric alloying compound, antioxidant, or pigment.

5. The molding compound of claim 1, wherein the nigrosines B) are melted in pure form with the polyarylene sulfides A).

6. A molding, film, fiber, semi-finished product, or composite material produced from the molding compound of claim 1.

* * * * *